United States Patent [19]

Fisch et al.

[11] Patent Number: 5,760,163
[45] Date of Patent: Jun. 2, 1998

[54] PREPARATION OF BRANCHED POLYAMIDES

[75] Inventors: Herbert Fisch, Wachenheim; Gunter Pipper, Bad Dürkheim; Jens Rieger; Martin Laun, both of Ludwigshafen; Volker Warzelhan, Weisenheim, all of Germany

[73] Assignee: BASF Aktiengesellschaft, Ludwigshafen, Germany

[21] Appl. No.: 748,978

[22] Filed: Nov. 14, 1996

[30] Foreign Application Priority Data

Nov. 18, 1995 [DE] Germany .................. 195 43 161.8

[51] Int. Cl.⁶ .................. C08G 69/08; C08G 69/14; C08G 73/10
[52] U.S. Cl. .................. 528/310; 528/323; 528/327; 528/328; 528/332; 528/397; 528/403; 528/405
[58] Field of Search .................. 528/403, 405, 528/397, 327, 310, 328, 323, 332

[56] References Cited

U.S. PATENT DOCUMENTS 4,599,400  7/1986  Tomalia et al. .................. 528/405
5,346,984  9/1994  Hasegawa et al. .................. 528/323

FOREIGN PATENT DOCUMENTS 345 648    12/1989  European Pat. Off. .
672 703     9/1995  European Pat. Off. .
682 057    11/1995  European Pat. Off. .
43 12 182   4/1993  Germany .
7/109352    4/1995  Japan .
96/35739   11/1996  WIPO .

OTHER PUBLICATIONS

J.M. Warakomski, *Polymer Preprints*, vol. 30, No. 1, pp. 117–118.

*Primary Examiner*—P. Hampton-Hightower
*Attorney, Agent, or Firm*—Keil & Weinkauf

[57] ABSTRACT

Branched polyamides are prepared by mixing

A) from 10 to 99.7% by weight of a melt of a polyamide prepolymer having a viscosity number of from 40 to 90 ml/g with B) from 0.3 to 6% by weight of a polybasic carboxylic acid, where the number n of the free carboxylic acid groups is $3 \leq n \leq 10$, and also C) from 0 to 80% by weight of further additives and processing aids, where the percentages by weight of the components A) to C) add up to 100%, and subsequently further condensing the mixture in the solid phase.

6 Claims, No Drawings

PREPARATION OF BRANCHED POLYAMIDES

BACKGROUND OF THE INVENTION

1. Field of the Invention

The present invention relates to an improved process for preparing branched polyamides, in particular those having a high molecular weight.

2. Description of the Related Art

US-A 4,599,400 and J. M. Warakomski, Polymer Prepints, 30 (1), pp. 117–118 disclose star-shaped polyamide structures based on polyamide 6. The brancher molecules used here are dendrimers containing amino groups, in particular containing 6 amino functions.

The preparation is carried out by cationically initiated ring-opening polymerization of ε-caprolactam, with the dendrimers being added to the monomer solution prior to polymerization.

DE-A 4 312 182 discloses branched polyamides which are prepared by means of aromatic carboxylic acids having a plurality of free carboxyl functions. The preparation is carried out by melt condensation of the polyfunctional brancher molecule with the monomers, eg. ε-caprolactam. This gives exclusively crosslinked polyamides which can no longer be processed. A similar process is disclosed in EP-A 345 648.

EP-A 672 703 discloses premixing branchers with polyamides and processing the mixture in a conventional manner. A disadvantage of the processes known from the prior art is the random incorporation of the polyfunctional compounds into the polyamide chain. In the case of the resulting branched polyamides, the molecular weights after polymerization are not controllable, depending on the number of reactive groups.

Furthermore, the random incorporation of the branchers influences the crystallization properties of the polyamides, reducing the total crystallinity. This leads to a deterioration in the mechanical properties, in particular stiffness.

SUMMARY OF THE INVENTION

It would be desirable to combine high stiffness with a better flow behavior (in comparison with the pure polyamides) during processing.

It is an object of the present invention to provide a process for preparing branched polyamides which is simple to carry out and which avoids the abovementioned disadvantages.

We have found that this object is achieved by the process as claimed in claim 1, which comprises mixing A) from 10 to 99.7% by weight of a melt of a polyamide prepolymer having a viscosity number of from 40 to 90 ml/g with B) from 0.3 to 6% by weight of a polybasic carboxylic acid, where the number n of the free carboxylic acid groups is $3 \leq n \leq 10$, and also C) from 0 to 80% by weight of further additives and processing aids, where the percentages by weight of the components A) to C) add up to 100%, and subsequently further condensing the mixture in the solid phase.

This process makes it possible to obtain, in a simple manner, branched polyamides, in particular ones having a high and controllable molecular weight, which have good flowability while simultaneously retaining the total crystallinity and thus display good mechanical properties, in particular a good stiffness.

DESCRIPTION OF THE PREFERRED EMBODIMENTS

In the first stage of the process of the present invention, a melt of from 10 to 99.7% by weight, preferably from 40 to 99.6% by weight and in particular from 60 to 99.5% by weight, of a polyamide prepolymer having a viscosity number of from 40 to 80 ml/g, preferably from 50 to 75 ml/g, is prepared in an appropriate plasticizing apparatus. The viscosity number is determined at 23° C. in accordance with ISO 1628 on a 0.5% strength by weight solution in concentrated sulfuric acid.

Polyamides which can be used for preparing the component A) are thermoplastic partially crystalline polyamides.

Suitable polyamides can be prepared, for example, by condensation of equimolar amounts of a saturated dicarboxylic acid having from 4 to 12 carbon atoms with a diamine having from 4 to 14 carbon atoms or by condensation of ωaminocarboxylic acids or polyaddition of lactams.

Examples of polyamides are polyhexamethyleneadipamide, polyhexamethyleneazelaamide, polyhexamethylenesebacamide, polyhexamethylenedodecanediamide, polytetramethyleneadipamide and the polyamides obtained by ring opening of lactams, for example polycaprolactam and polylauramide.

These partially crystalline polyamides are generally linear.

Particular preference is given to polytetramethyleneadipamide, polyhexamethyleneadipamide, polyhexamethylenesebacamide and polycaprolactam, and also copolyamides of terephthalic acid, hexamethylenediamine and ε-caprolactam or of terephthalic acid, isophthalic acid, if desired adipic acid and hexamethylenediamine containing more than 50% by weight of terephthalic acid/ hexamethylenediamine units; in particular polyhexamethyleneadipamide and polycaprolactam. However, it is also possible to use mixtures of different polyamides.

The polyamide prepolymers having a viscosity number of from 40 to 80 ml/g can be prepared by the processes described in EP-A 129 195 and 129 196.

According to these processes, an aqueous solution of the monomers is heated to from 250° to 300° C. under superatmospheric pressure and with simultaneous evaporation of water and formation of a prepolymer. Prepolymers and vapor are subsequently separated continuously, the vapor is rectified and the diamines therein are returned to the process. The prepolymer is finally passed to a polycondensation zone and polycondensed at from 250° to 300° C. under a gauge pressure of from 1 to 10 bar. It is important in this process that the aqueous salt solution is heated under a gauge pressure of from 1 to 10 bar for a residence time of less than 60 seconds, with the degree of conversion on leaving the evaporator zone advantageously being at least 93% and the water content of the prepolymer being at most 7% by weight.

These short residence times largely prevent the formation of triamines.

The aqueous solutions used generally have a monomer content of from 30 to 70% by weight, in particular from 40 to 65% by weight.

The aqueous salt solution is advantageously passed continuously at from 50° to 100° C. into an evaporator zone, where the aqueous salt solution is heated to from 250° to 330° C. under a gauge pressure of from 1 to 10 bar, preferably from 2 to 6 bar. The temperature used has to be above the melting point of the polyamide to be prepared in each case.

As already mentioned, it is important that the residence time in the evaporator zone is at most 60 seconds, preferably from 10 to 55 seconds and in particular from 10 to 40 seconds.

The conversion on leaving the evaporator zone is at least 93%, preferably from 95 to 98%, and the water content is preferably in the range from 2 to 5% by weight, in particular from 1 to 3% by weight.

The evaporator zone is advantageously configured as a tube bundle. Tube bundles which have been found to be particularly useful are ones in which the cross section of the individual tubes is configured so as to alternate at regular intervals between a tube and slit shape.

Furthermore, it has been found to be advantageous to pass the mixture of prepolymer and vapor before separation of the phases directly after the evaporator zone through a tubular mass transfer zone provided with internal fittings. The temperatures and pressure conditions employed in the evaporator zone are maintained here. The internal fittings, e.g. packing such as Raschig rings, metal rings or, in particular, packing of wire mesh, produce a large surface area. By this means, the phases, i.e. prepolymer and vapor, are brought into intimate contact. As a result, the amount of diamine given off with water vapor is considerably reduced. A residence time of from 1 to 15 minutes is generally maintained in the mass transfer zone. The mass transfer zone is advantageously configured as a tube bundle.

The two-phase mixture of vapor and prepolymer leaving the evaporator zone or mass transfer zone is separated. It generally separates on its own accord owing to the physical differences in a vessel, where the lower part of the vessel is advantageously configured as a polymerization zone. The vapors liberated consist essentially of water vapor and diamines which are given off on evaporation of the water. These vapors are passed into a column and rectified. Suitable columns are, for example, packed columns, bubble cap tray columns or mesh tray columns having from 5 to 15 theoretical plates. The column is advantageously operated under the same pressure conditions as the evaporator zone. The diamines present in the vapors are thus separated off and returned to the evaporator zone. It is also possible to feed the diamines to the downstream polymerization zone. The rectified water vapor formed is taken off at the top of the column.

The prepolymer obtained, which depending on its degree of conversion consists essentially of low molecular weight polyamide and possibly residual amounts of unreacted salts, is passed to a polymerization zone. In the polymerization zone, the melt formed is polycondensed at from 250° to 330° C., in particular from 270° to 310° C., and under a gauge pressure of from 1 to 10 bar, in particular from 2 to 6 bar. Advantageously, the vapors given off here are rectified in the column together with the abovementioned vapors. A residence time of from 5 to 30 minutes is preferably maintained in the polycondensation zone. The polyamide prepolymer thus obtained, which generally has a viscosity number of from 40 to 80 ml/g, preferably from 50 to 75 ml/g, measured at 23° C. on a 0.5% strength by weight solution in 96% strength sulfuric acid, is taken continuously from the condensation zone.

According to a preferred method of operation, the polyamide prepolymer thus obtained is passed in a molten state through a discharge zone with simultaneous removal of the residual water present in the melt. Suitable discharge zones are, for example, degassing extruders. The melt thus freed of the water is then extruded and granulated. The granules obtained are melted at 25° about 20° C. above the melting point of the polyamide (in the case of polyhexamethyleneadipamide at about 280° C.), preferably in a twin-screw extruder, and mixed with the carboxylic acid (component B) and, if used, C), extruded, cooled and granulated.

In a particularly preferred embodiment is it also possible to feed the component B) and, if used, C) directly into the degassing extruder, with in this case the degassing extruder usually being fitted with suitable mixing elements such as kneaders. Subsequently, it is likewise extruded, cooled and granulated.

These granules are condensed in the solid phase under inert gas, continuously or batchwise, at a temperature below the melting point, e.g. from 170° to 240° C., until the desired viscosity is reached. The batchwise solid-phase condensation can be carried out, for example, in tumble dryers; the continuous solid-phase condensation can be carried out in heating tubes through which hot inert gas flows. Preference is given to the continuous solid-phase condensation, with the inert gas used being nitrogen or in particular superheated steam, advantageously the water vapor obtained at the top of the column.

The viscosity number, measured at 23° C. on a 0.5% strength by weight solution in 96% strength sulfuric acid, is generally in the range from 100 to 500 ml/g, preferably from 120 to 200 ml/g, after the further condensation in the solid phase.

Suitable branching compounds (component B) are all polyfunctional carboxylic acids, with the number n of the free carboxylic acid groups being 3<n<10, preferably 3 or 4.

Such carboxylic acids are incorporated into the polyamide prepolymer melt in amounts of from 0.3 to 6% by weight, preferably from 0.4 to 5.8% by weight and in particular from 0.5 to 5% by weight.

Preference is given to carboxylic acids having aromatic and/or heterocyclic nuclei. Examples of such radicals are benzyl, naphthyl, anthracene, biphenyl, triphenyl, and also heterocycles such as pyridine, bipyridine, pyrrole, indole, furan, thiophene, purine, quinoline, phenanthrene, porphyrin, phthalocyanine, naphthalocyanine.

Preferred carboxylic acids are:

3,5,3',5'-biphenyltetracarboxylic acid, 1,3,5,7-naphthalenetetracarboxylic acid, 2,4,6-pyridinetricarboxylic acid, 3,5,3',5'-bipyridyltetracarboxylic acid, 3,5,3',5'-benzophenonetetracarboxylic acid, 1,3,6,8-acridinetetracarboxylic acid, with 1,3,5-benzenetricarboxylic acid (trimesic acid) and 1,2,4,5-benzenetetracarboxylic acid being particularly preferred.

Such compounds are commercially available or can be obtained by the methods described in DE-A 43 12 182.

As component C), it is possible to mix further additives and processing aids such as stabilizers, oxidation inhibitors, agents to prevent thermal decomposition and decomposition by ultraviolet light, mold release agents, colorants such as dyes and pigments, fibrous and pulverulent fillers and reinforcements, nucleating agents, plasticizers, etc., with A) and B). The proportion of these additives/processing aids is generally not more than 80% by weight, in particular not more than 50% by weight.

Examples of oxidation inhibitors and heat stabilizers are halides of metals of group I of the Periodic Table, e.g. sodium, potassium and/or lithium halides, if desired in combination with copper(I) halides, eg. chlorides, bromides, iodides, sterically hindered phenols, hydroquinone, aromatic secondary amines such as diphenylamines, various substituted representatives of these groups and their mixtures in concentrations of up to 1% by weight, based on the weight of the thermoplastic molding composition.

Examples of UV stabilizers which are generally used in amounts of up to 2% by weight, based on the molding composition, are various substituted resorcinols, salicylates, benzotriazoles and benzophenones.

Furthermore, it is possible to add organic dyes such as nigrosine, pigments such as titanium dioxide, cadmium sulfide, cadmium selenide, phthalocyanines, ultramarine blue and carbon black as colorants, and also fibrous and pulverulent fillers and reinforcements. Examples of the latter are carbon fibers, glass fibers, amorphous silica, asbestos, calcium silicate (wollastonite), aluminum silicate, magnesium carbonate, kaolin, chalk, powdered quartz, mica and feldspar. The proportion of such fillers and colorants is generally up to 50% by weight, preferably from 20 to 35% by weight.

Nucleating agents which can be used are, for example, talc, calcium fluoride, sodium phenylphosphinate, aluminum oxide and finely divided polytetrafluoroethylene.

Examples of plasticizers are dioctyl phthalate, dibenzyl phthalate, butyl benzyl phthalate, hydrocarbon oils, N-(n-butyl)benzenesulfonamide and o- and p-tolylethylsulfonamide.

To further improve the flame resistance, it is possible to add all flame retardants known for polyamides, in particular those based on phosphorus compounds or red phosphorus itself.

The process of the present invention makes it possible to obtain, in a simple manner, branched, in particular high molecular weight, polyamides which display a significantly better flow behavior during processing when compared with the pure polyamides. In comparison with the crosslinked polyamides known hitherto, the process of the present invention very largely retains the crystallinity, so that good mechanical properties, in particular a good stiffness, can be achieved.

EXAMPLES

Examples 1 to 4

Polyamide prepolymers were prepared by the process described in EP-A 129 195: 669.6 kg of an equimolar adipic acid/hexamethylene diamine salt were dissolved at 80° C. in 330.4 kg of water and continuously polycondensed in a tube bundle reactor at a throughput corresponding to a polyamide amount of 50 kg/h at 283° C. and a pressure of 2.8 bar. The PA 66 prepolymers had a viscosity number of 70 ml/g, measured at 23° C. on a 0.5% strength by weight solution in concentrated sulfuric acid (in accordance with ISO 1628).

The PA 66 prepolymers were melted in a twin-screw extruder at 300° C. and the melt was admixed with the amounts indicated in the table of 1,3,5-benzenetricarboxylic acid. The homogenized melt was extruded, cooled and granulated. The products were extracted in water for 8 hours so as to remove unreacted benzenetricarboxylic acid. Subsequently, the viscosity number (VN) was determined before the further condensation and the products were dried under reduced pressure.

The products were subsequently further condensed batchwise in the solid phase in a fixed heating tube (double-walled glass tube having a diameter of 120 mm and a length of 1000 mm and heated from the outside using oil) under nitrogen at 200° C. to the VN indicated in the table.

Example 5

The procedure corresponded to Examples 1 to 4, but the polyamide prepolymer used was a partially aromatic copolyamide (PA 6/6T) of the following composition:

70% by weight of units derived from hexamethylenediamine and terephthalic acid and 30% by weight of units derived from $\epsilon$-caprolactam.

The processing temperature in the fabrication was 320° C.

Comparative Examples 1 and 2

The procedure corresponded to Examples 1 to 4, but the amounts of 1,3,5-benzenetricarboxylic acid used were higher or lower than the range claimed, viz. 6.3% by weight (Comparative Example 1) and 0.2% by weight (Comparative Example 2).

Comparative Examples 3 and 4

The procedure corresponded to Examples 1 and 5, but no crosslinker was added.

Comparative Example 5 (as described in DE-A 43 12 182)

A monomer mixture comprising 19.8 g of trimesic acid and 3461 g of an equimolar adipic acid/hexamethylenediamine salt was placed in 2100 ml of water in a 10 l laboratory autoclave. The mixture was distributed over 5 glass tubes having a capacity of 800 ml.

The autoclave was first heated to 280° C. over 1 hour, with the resulting steam pressure being kept constant after reaching 20 bar by releasing excess water vapor. The autoclave was subsequently depressurized to atmospheric pressure at 280° C. over a period of 1 hour. Condensation was then continued for a further 2 hours at 280° C. under atmospheric pressure, before the autoclave was cooled to room temperature over a period of 3 hours.

The product was ground and subsequently extracted for 8 hours in water so as to remove unreacted benzenecarboxylic acid.

A VN measurement in accordance with the standard is not possible. The product is crosslinked and thus no longer soluble in $H_2SO_4$.

Comparative Example 6 (as described in DE-A 43 12 182)

3 kg of a monomer mixture comprising 138.7 g of trimesic acid and 3356.1 g of an equimolar adipic acid/hexamethylenediamine salt were placed in 2100 ml of water in a 10 l laboratory autoclave.

The mixture was distributed over 5 glass tubes having a capacity of 800 ml.

The autoclave was first heated to 280° C. over 1 hour, with the resulting steam pressure being kept constant after reaching 20 bar by releasing excess water vapor. The autoclave was subsequently depressurized to atmospheric pressure at 280° C. over a period of 1 hour. Condensation was then continued for a further 2 hours at 280° C. under atmospheric pressure, before the autoclave was cooled to room temperature over a period of 3 hours.

The product was ground and subsequently extracted for 8 hours in water so as to remove unreacted benzenecarboxylic acid.

A VN measurement in accordance with the standard is not possible. The product is crosslinked and thus no longer soluble in $H_2SO_4$.

Measurement methods

The MFI was determined in accordance with ISO 1133, viz. at 265° C. and a load of 3.8 kg for Examples 1–4 and Comparative Examples 1–3, 5 and 6, and at 335° C. and a load of 5 kg for Example 5 and Comparative Example 4.

As a relative measure of the degree of crystallinity, the specific heat of fusion $H_{cryst}$ was determined by means of Differential Scanning Colorimetry (DSC 9900 from DuPont). The enthalpies of fusion given in the table were determined from the 2nd melting curve (heating rate 20° C./min).

The viscosity number was determined in accordance with ISO 1628 (0.5% strength by weight solution in 96% strength by weight $H_2SO_4$ at 25° C.).

Elastic modulus and tensile strength were determined in accordance with DIN 53 455.

The compositions of the moldings and the results of the measurements are shown in the table.

TABLE

| Example | Polyamide | Initial VN [ml/g] | Brancher content [% by weight] | Heating time at 200° C. [min] | VN after heating [ml/g] | MFI after heating [ml/10 min] | Enthalpy of fusion [J/g] | Elastic modulus [MPa] | Tensile strength [MPa] |
|---|---|---|---|---|---|---|---|---|---|
| 1 | PA66 | 70 | 0.5 | 210 | 143 | 70.8 | 66 | 3105 | 87 |
| 2 | PA66 | 72 | 2 | 190 | 145 | 113.2 | 64 | 3084 | 91 |
| 3 | PA66 | 71 | 3.5 | 175 | 141 | 172 | 64 | 2980 | 86 |
| 4 | PA66 | 70 | 5.4 | 170 | 145 | >250 | 62 | 3120 | 85 |
| 5 | PA6/6T | 54 | 4 | 200 | 131 | 123 | 50 | 3260 | 93 |
| Comp. 1 | PA66 | 70 | 6.3 | 180 | not measurable | <1 | 34 | * | * |
| Comp. 2 | PA66 | 72 | 0.2 | 285 | 144 | 19.8 | 64 | 2902 | 84 |
| Comp. 3 | PA66 | 72 | — | 305 | 141 | 21.3 | 68 | 2960 | 86 |
| Comp. 4 | PA6/6T | 52 | — | 270 | 128 | 88 | 51 | 3225 | 92 |
| Comp. 5 | PA66 | | 0.5 | | insoluble | <1 | 31 | * | * |
| Comp. 6 | PA66 | | 3.5 | | insoluble | <1 | 24 | * | * |

*)processing into test specimens not possible

We claim:

1. A process for preparing branched polyamides, which comprises mixing
   A) from 10 to 99.7% by weight of a melt of a polyamide prepolymer having a viscosity number of from 40 to 90 ml/g, said viscosity number determined at 23° C. in accordance with ISO 1628 on a 0.5% strength by weight solution in concentrated sulfuric acid, with
   B) from 0.3 to 6% by weight of a polybasic carboxylic acid, where the number n of the free carboxylic acid groups is 3<=n<=10, and also
   C) from 0 to 80% by weight of further additives and processing aids,
where the percentages by weight of the components A) to C) add up to 100%, and subsequently further condensing the mixture in the solid phase wherein the component A) is made up of polyamide 66 or polyamide 6/6T or polyamide 66/6T or mixtures thereof.

2. A process as claimed in claim 1, wherein the polyamide after the further condensation in the solid phase has a viscosity number of at least 100 ml/g, said viscosity number determined at 23° C. in accordance with ISO 1628 on a 0.5% strength by weight solution in concentrated sulfuric acid.

3. A process as claimed in claim 1, wherein the number n of the free carboxylic acid groups is 3 or 4.

4. A process as claimed in claim 1, wherein the component B) is selected from the group consisting of 1,3,5-benzenetricarboxylic acid, 1,2,4,5-benzenetetracarboxylic acid, 3,5,3',5'-biphenyltetracarboxylic acid, 1,3,5,7-naphthalenetetracarboxylic acid or mixtures thereof.

5. A process as claimed in claim 1, wherein from 0.4 to 5.8% by weight of the component B) is used.

6. A thermoplastic molding composition obtained according to the process conditions as claimed in claim 1.

* * * * *

UNITED STATES PATENT AND TRADEMARK OFFICE
CERTIFICATE OF CORRECTION

PATENT NO.: 5,760,163

DATED: June 2, 1998

INVENTOR(S): FISCH et al.

It is certified that error appears in the above-identified patent and that said Letters Patent is hereby corrected as shown below:

Col. 7, claim 1, line 36, "polvamide" should be --polyamide--.

Signed and Sealed this

Eighteenth Day of August, 1998

Attest:

BRUCE LEHMAN

*Attesting Officer*  *Commissioner of Patents and Trademarks*